United States Patent [19]

Jesson et al.

[11] Patent Number: 4,787,792
[45] Date of Patent: Nov. 29, 1988

[54] DRILL SCREW

[75] Inventors: George Jesson; Frank Piacenti, both of Campbellsville, Ky.

[73] Assignee: USM Corporation, Farmington, Conn.

[21] Appl. No.: 27,141

[22] Filed: Mar. 16, 1987

Related U.S. Application Data

[63] Continuation of Ser. No. 765,581, Aug. 14, 1985, abandoned.

[51] Int. Cl.⁴ ............................................. F16B 25/00
[52] U.S. Cl. ...................................... 411/387; 408/229
[58] Field of Search ............... 411/386, 387, 421, 420; 10/10 R; 408/226-230

[56] References Cited

U.S. PATENT DOCUMENTS

| | | | |
|---|---|---|---|
| 2,388,482 | 11/1945 | Haynes | 411/387 |
| 4,064,784 | 12/1977 | Adler | 411/387 |
| 4,233,880 | 11/1980 | Bjorklund et al. | 411/387 |
| 4,407,620 | 10/1983 | Shinjo | 411/387 |
| 4,568,229 | 2/1986 | Hulsey | 408/230 |

FOREIGN PATENT DOCUMENTS 1316157  5/1973  United Kingdom ............... 411/387

Primary Examiner—Neill R. Wilson
Attorney, Agent, or Firm—Thomas S. Szatkowski

[57] ABSTRACT

A drilling and thread forming fastener is provided having a pilot end with a cutting tip and a pair of flutes formed thereon. The flutes define the length of the pilot end, which is tapered in one direction only over the greater portion of its extent.

3 Claims, 4 Drawing Sheets

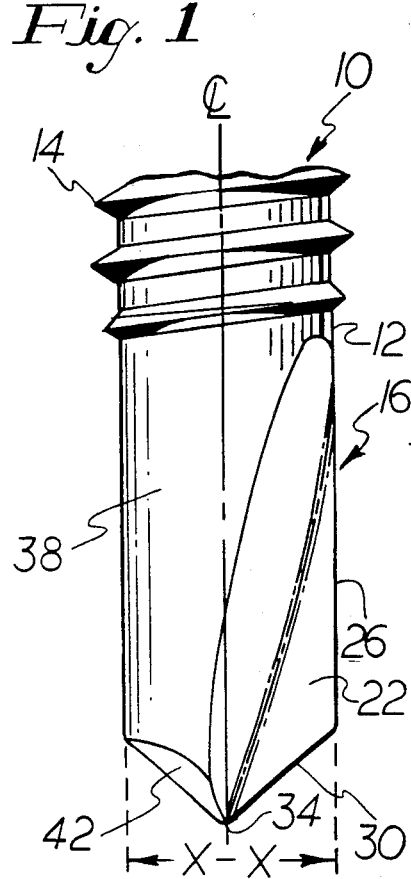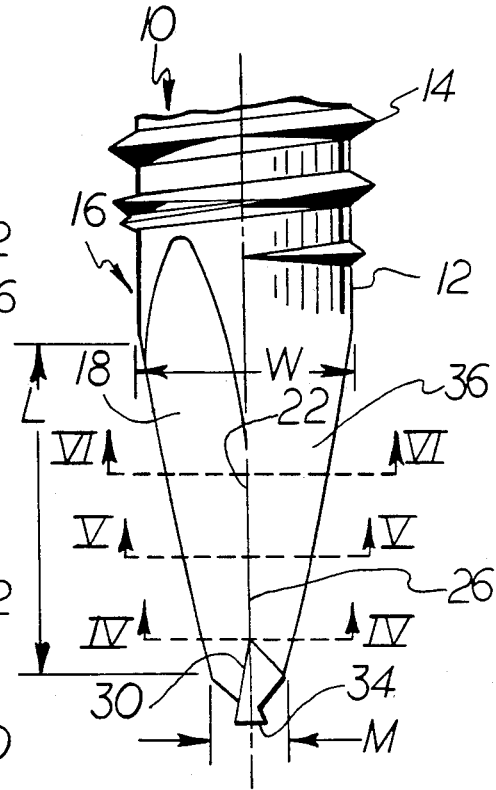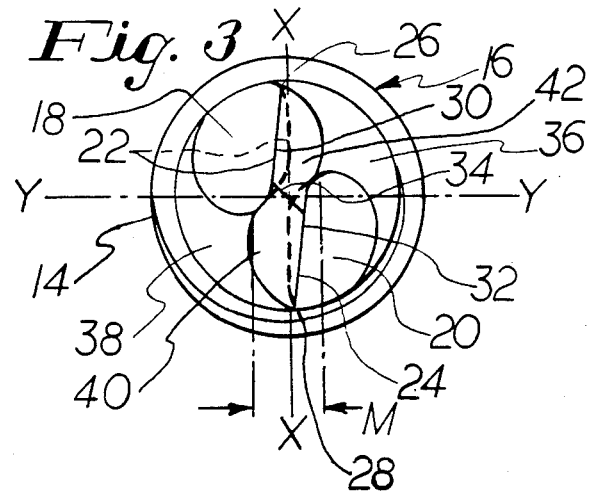

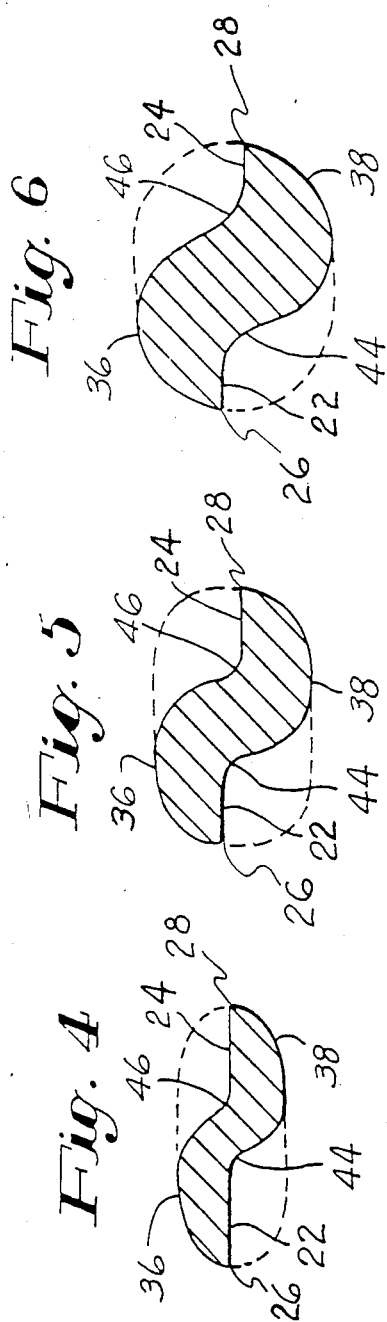

DRILL SCREW

This application is a continuation of co-pending application Ser. No. 765,581 filed on Aug. 14, 1985, now abandoned.

BACKGROUND OF THE INVENTION

The present invention relates to a rotary threaded fastener of the self-drilling and threading type, and more particularly to a fastener of that type which is manufactured by a pair of forging dies.

Various threaded fasteners of the self-drilling and thread forming type are known in the art, some of which are particularly adopted for manufacture by a milling process, while others are manufactured by a forging process which employs a pair of matched dies. A typical example of the type of drilling and thread forming fastener which is preferably formed by the forging process is shown in U.S. Pat. No. 3,395,603, issued Aug. 6, 1968 to E. J. Skierski and assigned to the assignee of the present invention. Fasteners manufactured in accordance with the teachings of this patent have met with wide acceptance as they provide a fastener which is simple to use, requiring no pre-drilling of the structure to which it is assembled, and fasteners of this type have proven to be easy to manufacture by mass production methods.

Recently, however, there has been a demand for self-drilling fasteners to be manufactured from high carbon steel, stainless steel, or metallic alloys which are of a hardness exceeding those of normal requirements. In some instances, it has been found that the forging dies employed to manufacture a drill point on these fasteners is susceptible to premature breakage, when these harder materials are employed. It is considered that the stresses inherent in present point forging die configurations trap the harder material of the headed blank being worked on during the point forging operation, and that the entrapment of the blank material and its subsequent cold flow generates excessive stresses in the point forging die, causing in some instances, a premature point forging die breakage.

With the wide use of the self-drilling and thread forming fasteners there has also been a requirement for the reduction in drilling time of the fastener. While existing point configurations which contain two flutes provide a satisfactory drill time in most applications, it is considered that they do not have sufficient clearance for chip flow to remove drilled material from the resultant hole, and thus to reduce drilling time. This occurs particularly when multi-layered assemblies of similar and dissimilar materials are operated upon. Such failure to remove drilled material can result in binding between the point and drilled hole surface causing excessive heat generation and resultant slower drill times.

The present invention therefore has as an object to provide a drilling and thread forming fastener of the type manufactured by a die forging process, which is effective to facilitate an increase in point forging die life.

Another object of the present invention is to provide a drilling and thread forming fastener wherein a greater clearance for escape of drilling chips is provided in the resultant drilled hole, during the drilling process.

Another object of the present invention is to provide a drilling and thread forming fastener which is susceptible to a reduction in drilling time over those drilling and thread forming fasteners of the prior art.

SUMMARY OF THE INVENTION

The aforementioned objects and other objectives which will become apparent as the description proceeds are accomplished by providing a drilling and thread forming fastener having a threaded shank and a pilot end wherein the pilot end has a transverse major axis and a transverse minor axis intersecting at the center line of the fastener. A pair of flutes extending longitudinally over the pilot end serve to form a pair of cutting surfaces, in cross-section defining the major axis. A pair of lands concentric with the center line of the shank are each formed of an arcuate surface extending outwardly to define the minor axis at its radial extent on any cross section of the pilot end. A substantially wedged shaped cutting tip is formed at the terminal portion of the pilot end. The minor axis increases in a linear progression from adjacent the cutting tip to a point remote from the cutting tip to thereby form an angular portion of said pilot end which longitudinal outer surface defines an angle with the fastener center line.

In a more detailed sense, the cutting surfaces are formed substantially parallel to one another over a greater portion of the pilot end angular portion.

A pair of mating dies are also provided for forming the above described structure in a forged pointing process, the inner surface of the dies substantially conforming to the configuration set forth above.

BRIEF DESCRIPTION OF THE DRAWINGS

Reference is made to the accompanying drawing in which there is shown an illustrative embodiment of the invention from which its novel features and advantages will be apparent wherein FIG. 1 is a fragmentary elevational view showing a portion of a drilling and thread forming fastener constructed in accordance with the teachings of the subject invention;

FIG. 2 is an elevational view showing the fastener portion of FIG. 1 rotated through 90%

FIG. 3 is an end view showing further details of the fastener of FIGS. 1 and 2;

FIG. 4 is a sectional view taken along the lines IV—IV of FIG. 2 showing details of the outer peripheral configuration of the fastener of FIGS. 1 though 3 at that section;

FIG. 5 is a sectional view taken along the lines V—V of FIG. 2 showing details of the outer peripheral configuration at that section;

FIG. 6 is a sectional view taken along the lines IV—IV of FIG. 2 showing details of the outer peripheral configuration of the fastener of FIGS. 1 through 3 at that section;

DESCRIPTION OF A PREFERRED EMBODIMENT

Figure 7:
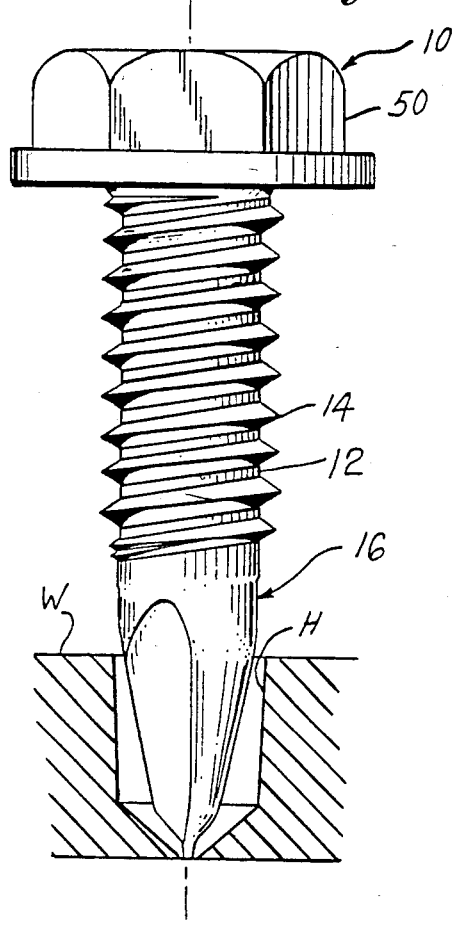
FIG. 7 is an elevational view similar to FIG. 2 showing the entire fastener of FIGS. 1 through 3 during the drilling operation.

Referring now to the drawings, and in particular to FIGS. 1 through 3, there is shown a drilling and threaded forming fastener 10 having a shank 12 bearing the continuous thread 14 and a pilot end 16. The fastener 10 is substantially symmetrical about the center line of the shank 12 and has a transverse major axis XX and a transverse minor axis YY intersecting at the center line. A pair of flutes 18 and 20 are formed in the pilot end 16 and extend longitudinally over the length of the pilot end to form a pair of cutting surfaces 22, 24 extending along the major axis and in general defining the extent of the major axis of the fastener at any section thereof.

Each of the cutting surfaces 22 and 24 defines a cutting edge 26, 28 running substantially parallel to the center line of the fastener and terminating in an angular portion 30, 32. Each of the angular portions 30 and 32 of the cutting edge terminates at a wedge shaped cutting tip 34. The cutting tip is disposed for preliminary entry into the metal surface to provide a lead for the cutting edges 30, 32, 26 and 28.

A pair of convex arcuate surfaces 36 and 38 form lands which extend along the length of the pilot end and terminate at an angular surface 40 and 42, respectively, which extend toward the center line of the fastener to join the cutting tip 34.

Referring now to FIGS. 4 through 6 it will be noted that as the cross section of the pilot end 16 progresses from the cutting tip 34 to the threaded shank 12, the major axis remains substantially constant while the minor axis increases, approaching the length of the major axis but remaining less throughout the length of the pilot end.

The taper of the pilot end 16 is considered to extend from the minimum dimension M as shown in FIGS. 2 and 3, to a maximum dimension W which is slightly less than the dimension of the X—X axis a that point. The minimum dimension M is in the range of 20% to 50% of the dimension W, and the taper generally extends over a length L which is in the range between 75% to 95% of the pilot end In each of the sections shown in FIGS. 4 through 6, it can be seen that each of the arcuate surfaces 36, 38 is connected to a cutting surface 22 or 24 by a concave surface 44, 46 the concave surface forming the base of the flute 18 or 20 over the length of the pilot end 16.

Figure 8:
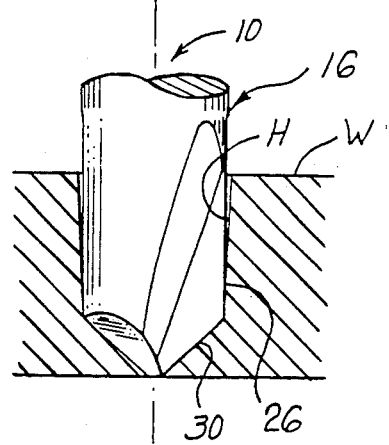
FIG. 8 is a fragmentary elevational view similar to FIG. 1 showing the fastener of FIG. 7 rotated through 90° during the drilling operation.

Referring to FIGS. 7 and 8, a fastener 10 of the type described with reference to FIGS. 1 through 6 is shown having a hex head 50 for driving the fastener. The fastener 10 is shown in its drilling position having progressed through the workpiece W forming an opening H therein by rotation during the yet incomplete drilling operation. As will be noted, when the fastener 10 rotates to its position shown in FIG. 7 there is a substantial space formed between the fastener and the opening H providing for material to be moved into the flutes 18 and 20 and subsequently removed from the opening during the operation. The drilling itself takes place by the action of the cutting edges 26, 28 and 30, 32 of the fastener 10 as shown positioned in FIG. 8.

Figure 9:
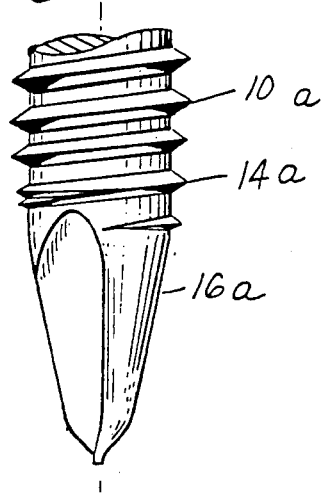
FIG. 9 is a fragmentary elevational view showing an alternate embodiment of the structure of FIGS. 7 and 8.

Referring to FIG. 9, there is a alternate embodiment of the invention similar to that shown in FIGS. 1 through 8. The fastener 10a shown in FIG. 9 is provided with threads 14a which extend down onto the pilot end 16a which is otherwise constructed in accordance with the description of FIGS. 1 through 8, above.

Figure 10:
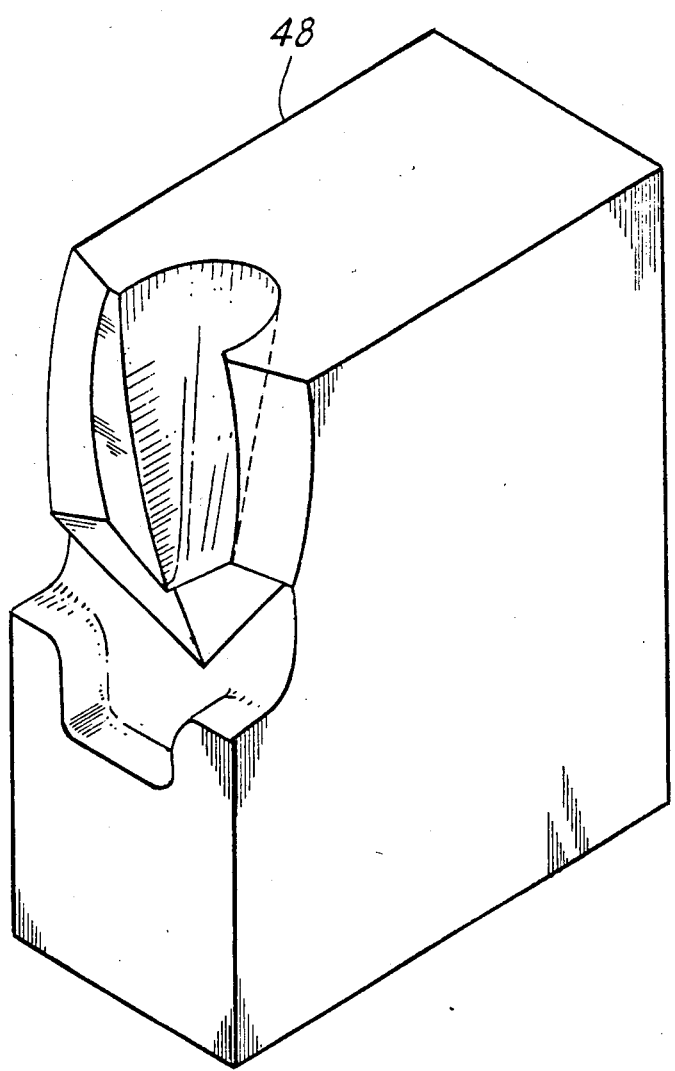
FIG. 10 is a perspective view showing one of a pair of dies which comprise the die set for manufacture of the fastener shown in FIGS. 1 through 9.

In FIG. 10, there is shown a die which is constructed to form the fastener of FIGS. 1 through 9 by a forging process. The die 48 is one of a pair of dies, or a die set, similarly constructed, which when forced together under high pressure are capable of forming the pilot end 16 of the fastener 10.

With the above described fastener, the objective of the invention have been achieved since the resultant shape of the point forging dies which are employed to form the elliptical cross section forces the excess headed blank material to flow more naturally and easily from the point forging die contour, thereby reducing the resultant bursting stresses that accompany the compaction of material during the forging operation. Also, by forming the cutting surfaces 22 and 24 such that they meet the arcuate surfaces 36 and 38 of the lands at the concave surfaces 44 and 46, there are no sharp edges provided on the internal contours of the cavity in the die structure to cause die failure. The elliptical reduction in cross sectional area also allows for a greater thickness of material in the forging dies at the point of greatest pressure, which strengthens the forging die and thus reduces breakage. As also is evident from FIGS. 7 and 8 of the drawing, the new configuration achieves nearly 360° of clearance for chip and material removal, that is, since the end points of the major axis of the elliptical cross section and the cutting edge of the point are the only points in contact with the material being drilled there is a reduced possibility of drilled material binding the drill point with the resultant slow down of drilling.

The fastener 10 has therefore provided an improvement over drilling and thread forming fasteners of the forged type which are known in the prior art and the configuration has proven to be advantageous in those applications where high carbon steels and stainless steel are employed in the manufacture of this type of fastener.

We claim

1. A drilling and thread forming fastener comprising a threaded shank and a pilot end, said pilot end having a transverse major axis and a transverse minor axis intersecting at the centerline of said fastener, a pair of flutes extending longitudinally over the length of said pilot end to form a pair of cutting surfaces in cross-section defining said major axis, a pair of lands concentric with the centerline of said shank and disposed on opposite sides of said major and said minor axes, each of said lands formed of a convex arcuate surface projecting outwardly from said major axis to define said minor axis at its radial extent on any cross-section of said pilot end, each said convex arcuate surface extending from the outer edge of one of said cutting surfaces to a concave arcuate surface of smaller radius formed between said land and a planar surface which extends from said concave arcuate surface to the inner edge of the other of said cutting surfaces wherein said convex arcuate surface and said concave arcuate transition between said land and said planar surface have a smooth contour and a substantially wedge shaped cutting tip formed at the terminal portion of said pilot ene wherein said minor axis increases in a linear progression from adjacent said cutting tip to a point remote from said cutting tip to thereby form an angular portion of said pilot end which longitudinal outer surface defines an angle with said fastener center line and wherein said cutting surfaces are substantially parallel to one another over a greater portion of said pilot end angular portion.

2. The fastener of claim 1 wherein the minimum dimension of said minor axis is in the range of 20% to 50% of the maximum dimension of said minor axis.

3. The fastener of claim 1 wherein the length of said angular portion of said pilot end is in the range between 75% to 95% of sid pilot end.

* * * * *